(12) United States Patent
Boecker et al.

(10) Patent No.: US 11,813,946 B2
(45) Date of Patent: Nov. 14, 2023

(54) FAIL OPERATIONAL VEHICLE POWER SUPPLY

(71) Applicant: Zoox, Inc., Foster City, CA (US)

(72) Inventors: Moritz Boecker, Millbrae, CA (US); Robert Ng, Mountain View, CA (US); Kyle Matthew Foley, Half Moon Bay, CA (US); Bryan Booth, San Francisco, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 201 days.

(21) Appl. No.: 17/093,388

(22) Filed: Nov. 9, 2020

(65) Prior Publication Data

US 2021/0114536 A1  Apr. 22, 2021

Related U.S. Application Data

(63) Continuation of application No. 15/713,448, filed on Sep. 22, 2017, now Pat. No. 10,829,066.

(51) Int. Cl.
*B60R 16/03* (2006.01)
*H02J 7/14* (2006.01)
(Continued)

(52) U.S. Cl.
CPC .............. *B60L 3/0046* (2013.01); *B60L 3/04* (2013.01); *B60L 58/21* (2019.02); *B60R 16/03* (2013.01);
(Continued)

(58) Field of Classification Search
CPC .......... B60L 3/0046; B60L 3/04; B60R 16/03; B60R 16/033; H02J 7/0029; H02J 7/1423; H02J 7/34; H02J 9/061; H01M 2220/20
See application file for complete search history.

(56) References Cited

U.S. PATENT DOCUMENTS

2013/0215536 A1* 8/2013 Eisenhauer ............ H02H 7/268
  361/42
2014/0203738 A1* 7/2014 Yamazaki ................ H02J 7/34
  320/124
2019/0092257 A1  3/2019 Boecker et al.

FOREIGN PATENT DOCUMENTS

CN    101356707 A    1/2009
JP    2009290958     5/2011
(Continued)

OTHER PUBLICATIONS

Final Office Action dated Dec. 26, 2019 for U.S. Appl. No. 15/713,448 "Fail Operational Vehicle Power Supply" Boecker, 13 pages.

(Continued)

*Primary Examiner* — Elim Ortiz
(74) *Attorney, Agent, or Firm* — Lee & Hayes, P.C.

(57) ABSTRACT

An electrical system can include a power supply configured to provide electrical power to components at a time at which the electrical system experiences an electrical fault. The electrical system can include a first battery electrically coupled in parallel to a second battery via an electrical bus, whereby the first and second batteries can provide electrical power to a first electrical load and a second electrical load. Upon experiencing a fault, a first circuit element can electrically decouple the first battery and the second battery by opening a circuit provided by the electrical bus, thereby isolating the first battery from the second battery. Next, the battery experiencing the fault can include a second circuit element that can electrically decouple the battery experiencing the fault from a respective electrical load, while the battery isolated from the fault can continue to provide electrical power to components.

20 Claims, 8 Drawing Sheets

(51) Int. Cl.
*B60L 3/04* (2006.01)
*B60L 3/00* (2019.01)
*H02H 3/087* (2006.01)
*B60L 58/21* (2019.01)
*H02J 9/06* (2006.01)
*H02J 7/34* (2006.01)
*H02J 7/00* (2006.01)
*H01M 50/597* (2021.01)
*B60R 16/04* (2006.01)
*H02H 7/26* (2006.01)
*B60R 16/033* (2006.01)
*H02H 7/18* (2006.01)
*H02H 7/28* (2006.01)
*H02H 3/033* (2006.01)

(52) U.S. Cl.
CPC .......... *B60R 16/04* (2013.01); *H01M 50/597* (2021.01); *H02H 3/087* (2013.01); *H02J 7/0029* (2013.01); *H02J 7/0047* (2013.01); *H02J 7/1423* (2013.01); *H02J 7/34* (2013.01); *H02J 9/061* (2013.01); *B60L 2240/549* (2013.01); *B60R 16/033* (2013.01); *H01M 2200/30* (2013.01); *H01M 2220/20* (2013.01); *H02H 3/033* (2013.01); *H02H 7/18* (2013.01); *H02H 7/268* (2013.01); *H02H 7/28* (2013.01); *H02J 2310/40* (2020.01); *H02J 2310/46* (2020.01)

(56) References Cited

FOREIGN PATENT DOCUMENTS

| | | |
|---|---|---|
| JP | 2015076959 | 4/2017 |
| JP | 2017144860 A | 8/2017 |
| JP | 2017140920 | 5/2018 |
| WO | WO2012104264 A2 | 8/2012 |
| WO | WO2016133174 | 8/2016 |

OTHER PUBLICATIONS

Office Action for U.S. Appl. No. 15/713,448, dated Jul. 10, 2019, Boecker, "Fail Operational Vehicle Power Supply", 16 pages.

The PCT Search Report and Written Opinion dated Nov. 20, 2018 for PCT Application No. PCT/US2018/051904, 13 pages.

European Office Action dated May 10, 2021 for European Patent Application No. 18783283.7, a counterpart foreign application of U.S. Pat. No. 10,829,066, 5 pages.

Office Action for Japanese Patent Application 2020-516641 dated Jul. 12, 2022, a foreign equivalent to U.S. Pat. No. 10,829,066 "Fail Operational Vehicle Power Supply" Becker,M. 16 pages.

The Chinese Office Action dated Apr. 29, 2023 for Chinese patent application No. 201880061558.7, a foreign counterpart of U.S. Pat. No. 10,829,066, 30 pages.

* cited by examiner

FAIL OPERATIONAL VEHICLE POWER SUPPLY

RELATED APPLICATIONS

This application is a continuation of and claims priority to U.S. patent application Ser. No. 15/713,448, filed on Sep. 22, 2017, titled "Fail Operational Vehicle Power Supply," the entirety of which is incorporated herein by reference.

BACKGROUND

Many devices and machines are powered by batteries. For example, electronic devices such as cameras, smartphones, tablets, portable speaker systems, and computers may be operated without the inconvenience of power cords by using a battery. In addition, medical devices, such as defibrillators, vital sign monitoring devices, and life support systems, may be portable and powered by a battery or include battery back-ups. The popularity of electric-powered vehicles at least partially relying on battery power has increased as well.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
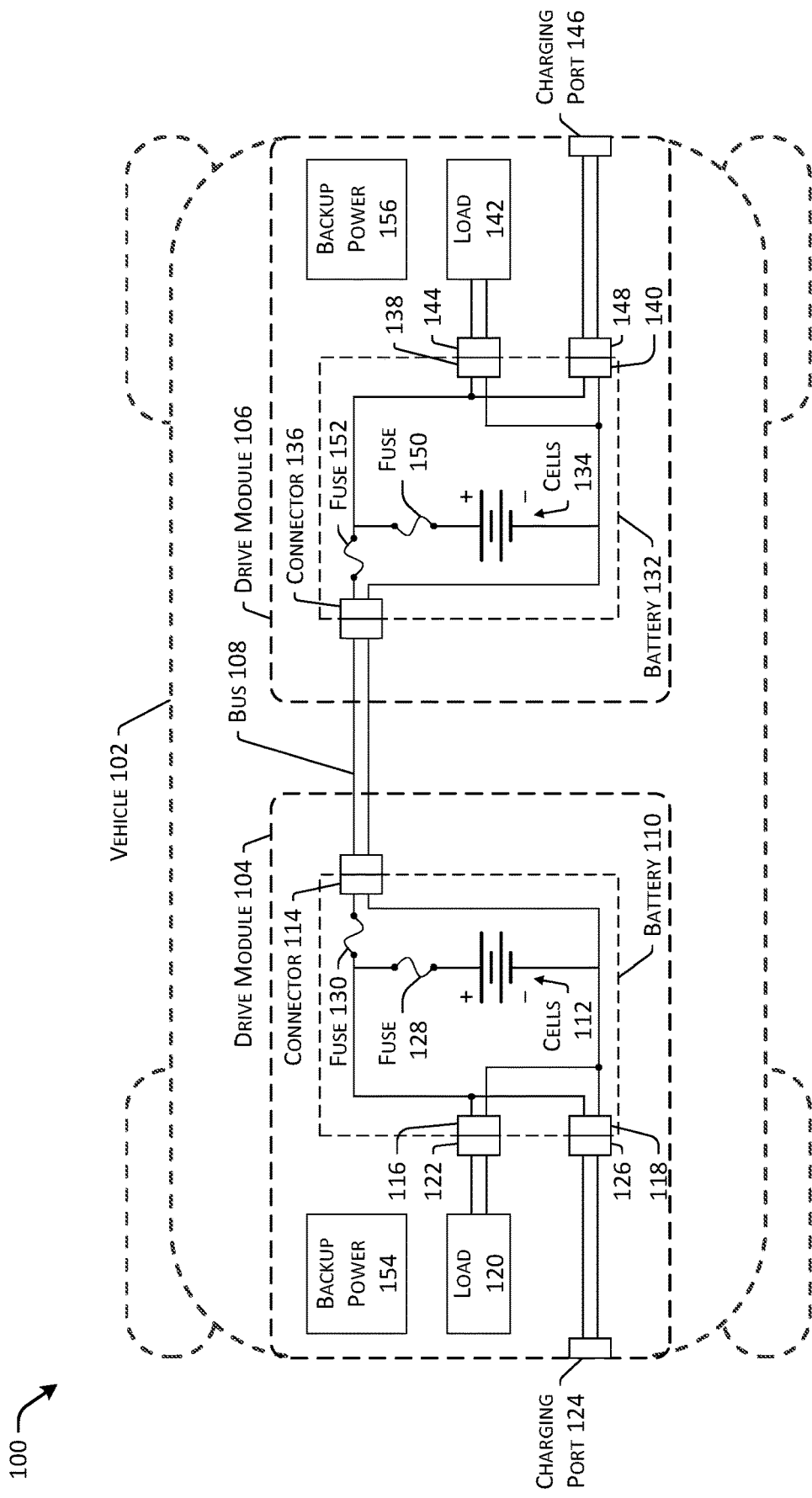
FIG. 1 illustrates an example architecture for implementing a dual battery system in a vehicle incorporating a fail operational vehicle power supply utilizing fuses.

This disclosure is generally directed to an electrical system configured to supply electric power to an electric load. For example, the electrical system can be used to supply electric power to devices and machines such as, for example, electronic devices, medical devices, and electric-powered vehicles that at least partially rely on batteries for electrical power. In some implementations, the electrical system can include a first battery and a second battery electrically coupled in parallel to provide electric power to a vehicle or other device. In some instances, the electrical system can be configured to react to an electrical fault associated with the first battery or the second battery by isolating the battery experiencing the fault. In some instances, the battery can be isolated via one or more thermal fuses, pyrotechnic fuses, switches, or the like.

The first battery and the second battery can be electrically coupled via a high voltage bus to provide electric power to one or more components of the vehicle. In some instances, the first battery can include a first fuse or switch configured to isolate the first battery from a first load, and a second fuse or switch to isolate the first battery from the high voltage bus. In some instances, the second battery can include a third fuse or switch configured to isolate the second battery from a second load, and a fourth fuse or switch configured to isolate the second battery from the high voltage bus. In some instances, the second fuse and the fourth fuse (or second switch and the fourth switch) can be configured to be triggered at a first current level, while the first fuse and the third fuse (or the first switch and the third switch) can be configured to be triggered at a second current level, wherein the first current level is lower than the second current level. Thus, when the first battery experiences a fault, such as a short circuit internal to the first battery, a short circuit in cabling, or a short circuit in the first load, the second fuse or switch can be triggered at a first time, thereby severing the connection of the first battery to the high voltage bus (thereby electrically uncoupling the first battery from the second battery). Subsequently, the first fuse or switch can be triggered at a second time after the first time, thereby severing the connection of the first battery to the first load. Accordingly, the operations discussed herein can prevent a fault associated with a first battery from damaging the second battery. Further, because the second battery remains operational, the second battery can provide electric power to various components of the vehicle to allow the vehicle remain operational despite encountering a fault.

Various configurations of the electrical system are contemplated. For example, the fail operational protection can be provided by any circuit protection device, and is not limited to thermal fuses, pyrotechnic fuses, breakers, relays, or switches. For example, the electrical system can include a current sensing device configured to sense or measure bidirectional current on the high voltage bus to determine a current indicative of fault or short circuit. The current sensing device can be coupled to a controller that can control one or more pyrotechnic fuses, switches, or the like, to open various circuit elements at various current levels and/or times to protect the components as discussed herein. In some instances, the circuit elements can include, but are not limited to, one or more of a: thermal fuse; pyrotechnic fuse; relay; MOSFET (metal-oxide semiconductor field effect transistor); BJT (bipolar junction transistor); IGBT (insulated gate bipolar transistor); SCR (silicon controlled rectifier); TRIAC (triode for alternating current); GTO (gate turn-off thyristor); and the like.

In some instances, the first battery can be installed in a first drive module and the second battery can be installed in a second drive module, whereby the first and second drive modules can be removably coupled to a body module of a vehicle. Thus, the drive modules can be added to and removed from a vehicle to facilitate maintenance and reconfigurations of the modules. In some instances, an individual drive module can include various components to facilitate operation of the vehicle, including but not limited to: drive motor(s); steering motor(s); voltage converter(s); computing system(s); air conditioning system(s); heating system(s); braking system(s); light(s); blower(s); audio system(s);

charging port(s); sensor(s); and the like. In some examples, the vehicle can include two or more batteries providing electric power to the vehicle.

In examples in which each drive module includes all major systems of the vehicle, the vehicle will include at least two instances of every major system, thereby providing redundancy. This redundancy enables the device to remain operational despite failure of a major system or component of the vehicle. That is, if one instance of a system on one drive module fails or needs servicing, the other instance of the system on the other drive module remains functional allowing the vehicle to continue operating. In that sense, the vehicle is "fail operational." By way of example and not limitation, if a first battery of a first drive module fails, the failed drive module may be disconnected and the vehicle may continue to operate under the power of a second battery of a second drive module until such time as the first drive module can conveniently be serviced. Further, individual drive modules may include backup power systems, such as a 12V or 24V battery system, to provide power to a subset of components, such as a computing system, braking system, steering system, etc. Thus, in the event of a failure, as discussed herein, the backup power system can provide electrical power to various components to maintain operations of the vehicle.

In some examples, the vehicle may be an autonomous vehicle configured to travel without control from a driver between two locations. Other types of vehicles are contemplated, such as semi-autonomous vehicles, aircraft, boats, trucks, non-autonomous vehicles, etc.

In some examples, the vehicle can include two or more batteries providing electric power to the vehicle.

The methods, apparatuses, and systems described herein can be implemented in a number of ways. Example implementations are provided below with reference to the following figures. Although discussed in the context of vehicles, the methods, apparatuses, and systems described herein can be applied to a variety of electrically powered devices, and is not limited to vehicles.

FIG. 1 illustrates an example architecture 100 for implementing a dual battery system in a vehicle incorporating a fail operational vehicle power supply utilizing fuses. As illustrated in FIG. 1, a vehicle 102 can include the various components discussed herein. For instance, the vehicle 102 can include drive modules 104 and 106 including components that can be coupled together to provide functionality to the vehicle 102. In some instances, the drive modules 104 and 106 can include components to provide electrical power to the vehicle 102. In some instances, the drive modules 104 and 106 can be electrically coupled via a bus 108.

Turning to the drive module 104, the drive module 104 can include a battery 110 that stores electrical energy in one or more cells 112. The battery 110 can include various connectors 114, 116, and 118 to couple the battery 110 to various components in the vehicle 102. For example, the connector 114 can be coupled to the bus 108, the connecter 116 can be coupled to a load 120 via a connector 122, and the connector 118 can be coupled to a charging port 124 via a connector 126. Further, the battery 110 can include a first fuse 128 and a second fuse 130, the operation of which is discussed herein. In some instances, although the first fuse 128, the second fuse 130, and the connector 114 are illustrated as being internal to the battery 110, the components can be separate from and/or external to the battery 110.

Turning to the drive module 106, in some instances, the drive module 106 can be substantially the same as the drive module 104. That is, in some instances, the drive module 104 and 106 can be substantially identical drive modules that are coupled to opposite ends of the vehicle 102. Accordingly, in such an example, the drive module 106 can include a battery 132 that stores electrical energy in one or more cells 134. The battery 132 can include various connectors 136, 138, and 140 to couple the battery 132 to various components in the vehicle 102. For example, the connector 136 can be coupled to the bus 108, the connecter 138 can be coupled to a load 142 via a connector 144, and the connector 140 can be coupled to a charging port 146 via a connector 148. Further, the battery 132 can include a third fuse 150 and a fourth fuse 152 (e.g., relative to the first fuse 128 and the second fuse 130), the operation of which is discussed herein. In some instances, although the first fuse 150, the second fuse 152, and the connector 136 are illustrated as being internal to the battery 132, the components can be separate from and/or external to the battery 132.

In some examples, the batteries 110 and 132 can be electrically coupled in parallel to provide electrical power to the loads 120 and 142 to provide functionality to the vehicle 102. In some examples, the vehicle 102 can encounter a fault such as a short circuit in a load, wiring, internal to the batteries, etc. As discussed herein, a reference to a "faulty battery" can correspond to a fault internal to a particular battery, or to a fault associated with a drive module associated with the particular battery. In one example, consider a fault including a short circuit of the load 142. In such an example, the short circuit can draw a spike or surge in current which could otherwise damage or destroy various components of the vehicle 102 if not protected by the fail operational architecture 100, as discussed herein.

An operation of the architecture 100 in the example of a fault (e.g., a short circuit) in the load 142 is as follows. First, the load 142 can draw a spike in current. The fuses 130 and 152 can be rated to fail at a first current level that is lower than the second current level associated with the fuses 128 and 150, respectively. Thus, in this example, a fault in the load 142 can trigger one or both of the fuses 130 and 152 (e.g., "blow the fuse") to break the circuit at a first time, effectively severing the connection provided by the bus 108. With the drive module 104 isolated from the drive module 106 (by virtue of one or both of the fuses 130 or 152 being triggered or "blown"), the drive module 104 is isolated from any damaging effects of the fault, and can continue to provide functionality to the vehicle 102. Next, the fault at the load 142 can continue to draw current from the battery 132, and at a second time after the first time, can trigger the fuse 150, thereby opening the circuit with respect to the battery 132, and thereby preventing any further damage caused by the fault.

By way of example, and without limitation, the sizing of the fuses 128, 130, 150, and 152 can be based at least in part on expected power requirements of the vehicle. For example, if a maximum expected current is 100 amps (A), the fuses 130 and 152 may be rated (e.g., have an $I^2t$ value) at a value above the maximum expected current but below a rating of the fuses 128 and 150. For example, in such an example, the fuses 130 and 152 can be rated at 200 amps, while the fuses 128 and 150 can be rated at 250 amps, respectively. The ratings of the fuses may be based on, for example, maximum currents tolerances of associated components (e.g., based on a maximum current that each component in the associated circuit can support), fixed percentages (e.g., 120% and 150% of the maximum expected current), or the like. Thus, it can be understood that one or both of the fuses 130 and 152 can be triggered before the fuses 128 and 150 in the event of an electrical fault to isolate the batteries and to prevent further damage or disruption to the components of vehicle 102. Of course, the numbers used herein are merely illustrative examples, and the fuses 128, 130, 150, and 152 can include any size or rating. In some examples, the fuses 128, 130, 150, and 152 can each be on the order of 100 amps, 200 amps, 500 amps, 1000 amps, 2000 amps, etc. Further, though depicted in the context of a vehicle in FIG. 1 for illustrative purposes, it should be appreciated that such a configuration may be used similarly in devices having parallel power configurations. In such configurations, current limits for the first and second fuses may be substantially lower, for example, on the order of milliamps.

Further, in some instances, the fuses can be triggered in any order, and are not limited to the particular order discussed herein. For example, the fuse 128 can be sized to trigger before or at a same time as the fuse 130.

In some instances, after the drive modules 104 and 106 are electrically decoupled via the bus 108 as discussed herein, one of the drive modules 104 and 106 can provide power to the other module (e.g., in the form of 5 V power, 12 V power, 24 V power, etc.) to provide functionality to various components in the faulty drive module (e.g., to provide power to one or more of brakes, steering, computing systems, cabin blowers, doors, lights, etc.). For example, the drive module 104 can be electrically coupled to the drive module 106 via a low-voltage bus (e.g., relative to the bus 108). In some examples, the drive modules 104 and 106 can include backup power supplies 154 and 156, respectively, to provide low voltage power (e.g., 12 V, 24 V, 36 V, etc.) to components of the vehicle, such as the computing system, steering system, braking system, etc. Of course, the backup power 154 and 156 are not limited to providing power to the aforementioned systems. In some instances, the backup power 154 and 156 can individually include a rechargeable battery system. Thus, in this manner, the operation of the power system can be said to be "fail operational," such that the vehicle 102 can continue to operate in the event of an electrical fault to one of the batteries 110 and 132.

Turning to the loads 120 and 142, the loads 120 and 142 can represent any electrical load corresponding to vehicle components. For example, each of the load 120 and 142 can include, but is not limited to, one or more of: drive motor(s); steering motor(s); voltage converter(s); computing system(s); air conditioning system(s); heating system(s); braking system(s); light(s); blower(s); audio system(s); charging port(s); sensor(s); and the like.

In some instances, the charging ports 124 and 146 can be coupled to an external power source to facilitate charging of the vehicle 102. For example, the charging port 124 can be coupled to an external source of power (such as an electrical grid) to receive power to charge the battery 110 and the battery 132. Similarly, the charging port 146 can be coupled to an external source of power to charge the battery 110 and the battery 132. Thus, connecting only one of the charging ports 124 or 146 to an external power source can charge both batteries 110 and 132 of the vehicle 102. In some instances, the vehicle 102 can include any number of batteries connected in series or parallel, some or all of which can be charged by power being applied to one charging port.

In some examples, the charging ports 124 and 146 can be coupled to other devices to provide power from vehicle 102 to the devices, such as a disabled vehicle, or to provide power to a utility grid (e.g., during times of peak loads on the grid). In some examples, the charging ports 124 and 146 can utilize conductive coupling and/or inductive coupling to transfer power to or from the vehicle 102.

In some instances, the batteries 110 and 132 can include any type of battery, such as a rechargeable or non-rechargeable battery including but not limited to a lead-acid battery, aluminum-ion battery, flow battery, glass battery, lithium air battery, lithium-ion battery, magnesium-ion battery, nickel-cadmium battery, nickel hydrogen battery, nickel-iron battery, nickel-zinc battery, polymer-based battery, polysulfide bromide battery, potassium-ion battery, alkaline battery, silicon air battery, silver-zinc battery, silver calcium battery, sodium-ion battery, sodium-sulfur battery, sugar battery, super iron battery, zinc ion battery, and the like.

Although not shown in FIG. 1, the architecture may also include other components, such as, for example, other fuses, circuit breakers, surge protectors, resistors, capacitors, transistors, current sensors, voltage sensors, voltage converters, etc., for increasing safety, facilitating operation, and/or improving operation.

Figure 2:
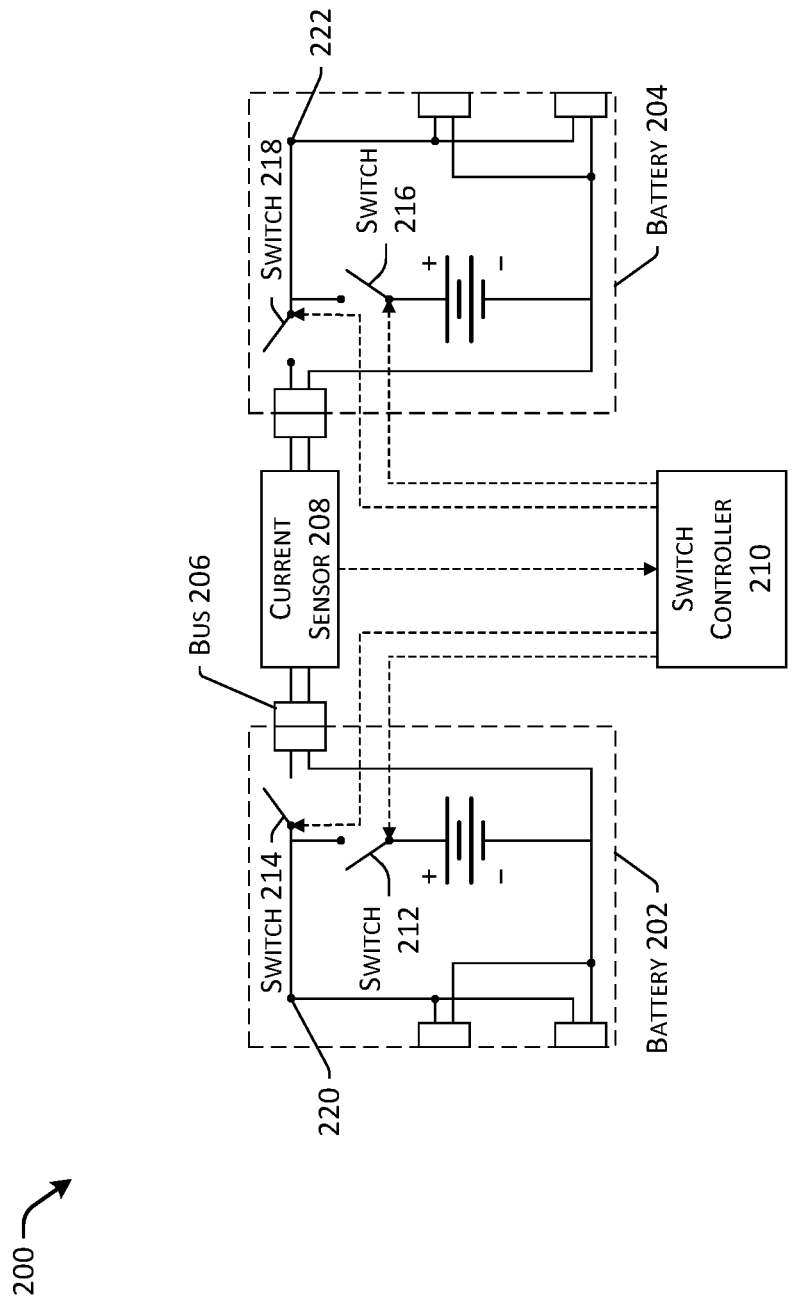
FIG. 2 illustrates an example architecture for implementing a fail operational dual battery system in a vehicle utilizing switches.

FIG. 2 illustrates an example architecture 200 for implementing a fail operational dual battery system in a vehicle utilizing switches. The architecture 200 can be implemented in the vehicle 102 of FIG. 1, or in other devices, as discussed herein. For clarity, some components discussed above in connection with FIG. 1 are not included in FIG. 2.

The architecture 200 illustrates the battery 202 coupled to the battery 204 via a bus 206. In some instances, the bus 206 can include a current sensor 208 that can monitor a current on the bus 206 and provide an indication of the current to a switch controller 210. In turn, the switch controller 210 can be communicatively coupled to a first switch 212 and a second switch 214 in the battery 202, and a third switch 216 and a fourth switch 218 in the battery 204.

In some examples, the current sensor 208 can monitor a magnitude and/or direction of current on the bus 206 to determine whether a fault is occurring in the battery 202 or 204. For example, a positive current detected by the current sensor 208 can indicate a power transfer from the battery 202 (or from the drive module corresponding to the battery 202) to the battery 204 (or to the drive module corresponding to the battery 204), while a negative current can correspond to a reverse of the power flow. In some instances, if a magnitude of the current sensed by the current sensor 208 is above a threshold amount of current, the switch controller 210 can determine that a fault is occurring, and can implement the load operational circuit protection, as discussed herein.

For example, a current above a threshold value can be indicative of an electrical fault. Accordingly, the switch controller 210 can transmit control signals to one or both of the switches 214 and 218 to open the connection provided by the bus 206, thereby isolating the fault from the remaining operational battery. Based on a direction of the current flow (e.g., indicating a location of the fault), the switch controller 210 can transmit a control signal to the switch 212 or 216 to disconnect the faulty battery (e.g., the battery associated with the fault) from the fault. For example, if the battery 202 is providing power towards the battery 204 (a positive current flow), the switch controller 210 can control the switch 216 to open, thereby disconnecting the battery 204, while refraining from disconnecting the battery 202.

In some instances, the switches 212, 214, 216, and 218 can correspond to any controllable circuit protection device. For example, the switches 212, 214, 216, and 218 can include, but are not limited to, one or more of a: circuit breaker, relay, pyrotechnic fuse; MOSFET (metal-oxide semiconductor field effect transistor); BJT (bipolar junction transistor); IGBT (insulated gate bipolar transistor); SCR (silicon controlled rectifier); TRIAC (triode for alternating current); GTO (gate turn-off thyristor); and the like.

In some instances, the switch controller 210 can determine a threshold current indicative of a fault based on a number of factors, including but not limited to: a speed of the vehicle; an expected electrical load of the vehicle (e.g., based on a number or weight of passengers or cargo, HVAC levels, computing requirements, etc.); a route of the vehicle (e.g., traversing uphill, downhill, etc.); ambient temperature; vehicle (e.g., battery) temperature; age of the vehicle or battery; time since last servicing; number of battery cycles; an amount of torque one or more motors are instructed to produce; and the like. Thus, the threshold current levels can be dynamically determined and/or set based on a current state of the vehicle or device.

In some instances, the switch controller 210 can be programmed based at least in part on one or more machine learned algorithms to determine an expected current level based on conditions of the vehicle. For example, the switch controller 210 can use various information, for example, historical, geographic, and/or real-time information received from the vehicle systems and/or from one or more sources remote from the vehicle 102, to predict future load demands of the electric load. In some instances, if the sensed current is above a threshold based on the expected or predicted load demands, the switch controller can implement the fail operational circuit protection, as discussed herein.

In some instances, the architecture 200 can include any number of current sensors located at any point in the illustrative circuit. For example, the battery 202 can include a first current sensor located at a point 220, while the battery 204 can include a second current sensor located at a point 222 of the architecture 200. In some instances, when the first current sensor located at the point 220 determines that a current meets or exceeds a threshold current, the controller 210 can trigger the switch 214 followed by the switch 212 to isolate the first battery 202 from a load. In some instances, when the second current sensor located at the point 222 determines that a current meets or exceeds a threshold current, the controller can trigger the switch 218 followed by the switch 216 to isolate the second battery 204 from a load.

Further, it can be understood that the switch controller 210 can control any switch in any order. Further, the switch controller 210 can open or close the switches 212, 214, 216, and 218 upon detecting a fault or in the absence of a fault (e.g., for diagnostics, load balancing, to preserve battery life, maintenance, and the like). Thus, the switch controller 210 can selectively enable the switches to control the distribution of power in the architecture 200, as discussed herein.

Figure 3:
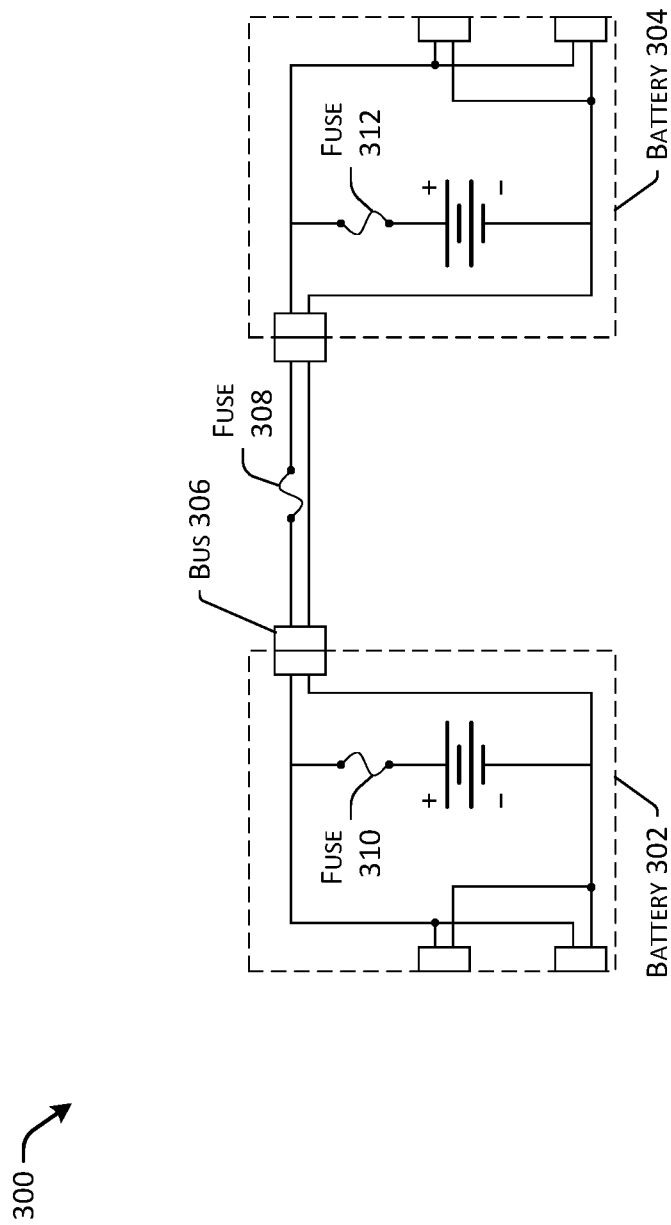
FIG. 3 illustrates another example architecture for implementing a fail operational dual battery system in a vehicle utilizing fuses.

FIG. 3 illustrates another example architecture 300 for implementing a fail operational dual battery system in a vehicle utilizing fuses. The architecture 300 can be implemented in the vehicle 102 of FIG. 1, or in other devices, as discussed herein. For clarity, some components discussed above in connection with FIG. 1 are not included in FIG. 3.

The architecture 300 illustrates a first battery 302 coupled to a second battery 304 via a bus 306. In some instances, the bus 306 can include a fuse 308 that can be sized to break, interrupt, or otherwise disrupt the connection between the battery 302 and 304 in the event of a fault condition, as discussed herein. Further, the battery 302 can include an internal fuse 310, and the battery 304 can include an internal fuse 312.

The fuses 308, 310, and 312 can be sized to implement the fail operational behavior, as discussed herein. For example, the fuse 308 can be selected to trigger (e.g., be "blown" or otherwise break the circuit) before the fuses 310 and 312 to break the connection of the bus 306 in the event of a fault in either the battery 302 (or the drive module associated with the battery 302) or the battery 304 (or the drive module associated with the battery 304). Following the triggering of the fuse 308, the fuse 310 or 312 that is still coupled to the faulty component can trigger next, isolating the faulty battery from the operation of the vehicle 102 while protecting the operation of the functional battery. Thus, the architecture 300 can encounter a fault and recover to provide electrical power to the vehicle 102.

In some examples, one or more of the fuses 308, 310, or 312 can be replaced with one or more switches, as discussed herein.

Figure 4:
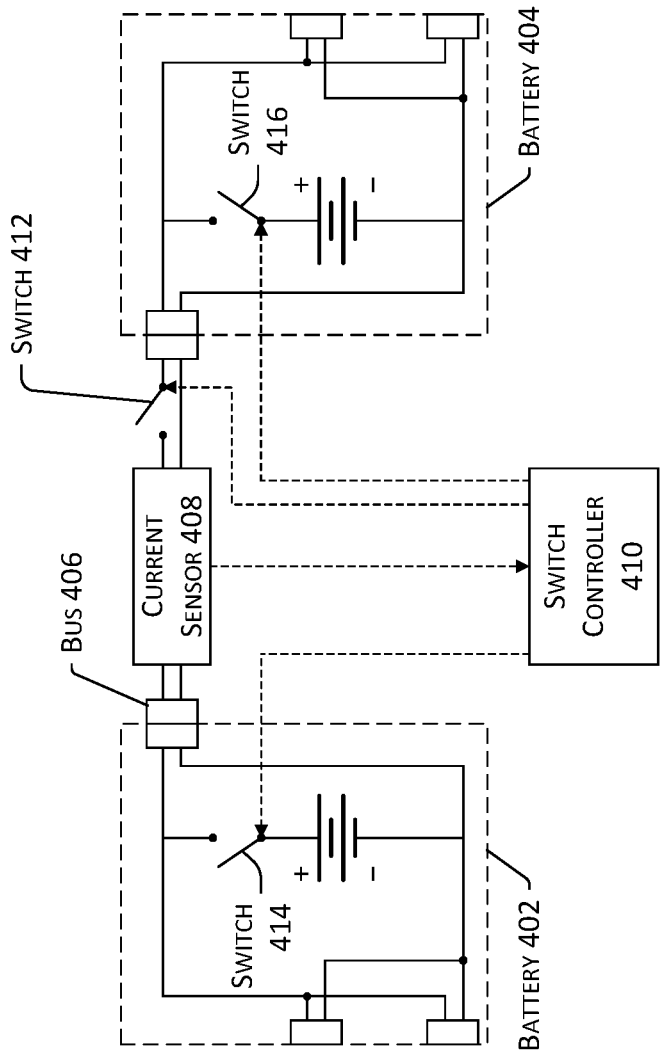
FIG. 4 illustrates another example architecture for implementing a fail operational dual battery system in a vehicle utilizing switches.

FIG. 4 illustrates another example architecture for implementing a fail operational dual battery system in a vehicle utilizing switches. The architecture 400 can be implemented in the vehicle 102 of FIG. 1, or in other devices, as discussed herein. For clarity, some components discussed above in connection with FIG. 1 are not included in FIG. 4.

The architecture 400 illustrates the battery 402 coupled to the battery 404 via a bus 406. In some instances, the bus 406 can include a current sensor 408 that can monitor a current on the bus 406 and provide an indication of the current to a switch controller 410. Further, the bus 406 can include a switch 412 that can be communicatively controlled by the switch controller 410 to open the bus 406 upon detecting a fault prior to opening one of the switches 414 and 416 located in connection with the battery 402 and 404, respectively, based upon a determined location of a fault.

Similar to the current sensor 208 discussed above with respect to FIG. 2, the current sensor 408 can monitor a magnitude and/or direction of current flow on the bus 406 to determine whether a fault is occurring in the battery 402 or 404. For example a positive current detected by the current sensor 408 can indicate a power transfer from the battery 402 (or from the drive module corresponding to the battery 402) to the battery 404 (or to the drive module corresponding to the battery 404), while a negative current can correspond to a reverse of the power flow. In some instances, if a magnitude of the current sensed by the current sensor 408 is above a threshold amount of current, the switch controller 410 can determine that a fault is occurring, and can implement the load operational circuit protection, as discussed herein.

For example, a current above a threshold value can be indicative of an electrical fault. Accordingly, the switch controller 410 can transmit a control signal to the switch 412 to open the connection provided by the bus 406, thereby isolating the fault from the remaining operational battery. Based on a direction of the current flow (e.g., indicating a location of the fault), the switch controller 410 can transmit a control signal to the switch 414 or 416 to disconnect the battery (or other faulty component of the drive module) associated with the fault from the fault. For example, if the battery 402 is providing power towards the battery 404, the switch controller 410 can control the switch 416 to open, thereby disconnecting the battery 404, while refraining from disconnecting the battery 402.

Similar to the architecture 200, the architecture 400 can include any number of current sensors located at any point in the system. Further, the switch controller 410 can control the operation of the switches 412, 414, and 416 in any order, and is not limited to operation in response to detecting a current that meets or exceeds a threshold. Thus, the architecture 400 can provide a flexible arrangement to enable or disable power transfer in a variety of configurations.

Figure 5:
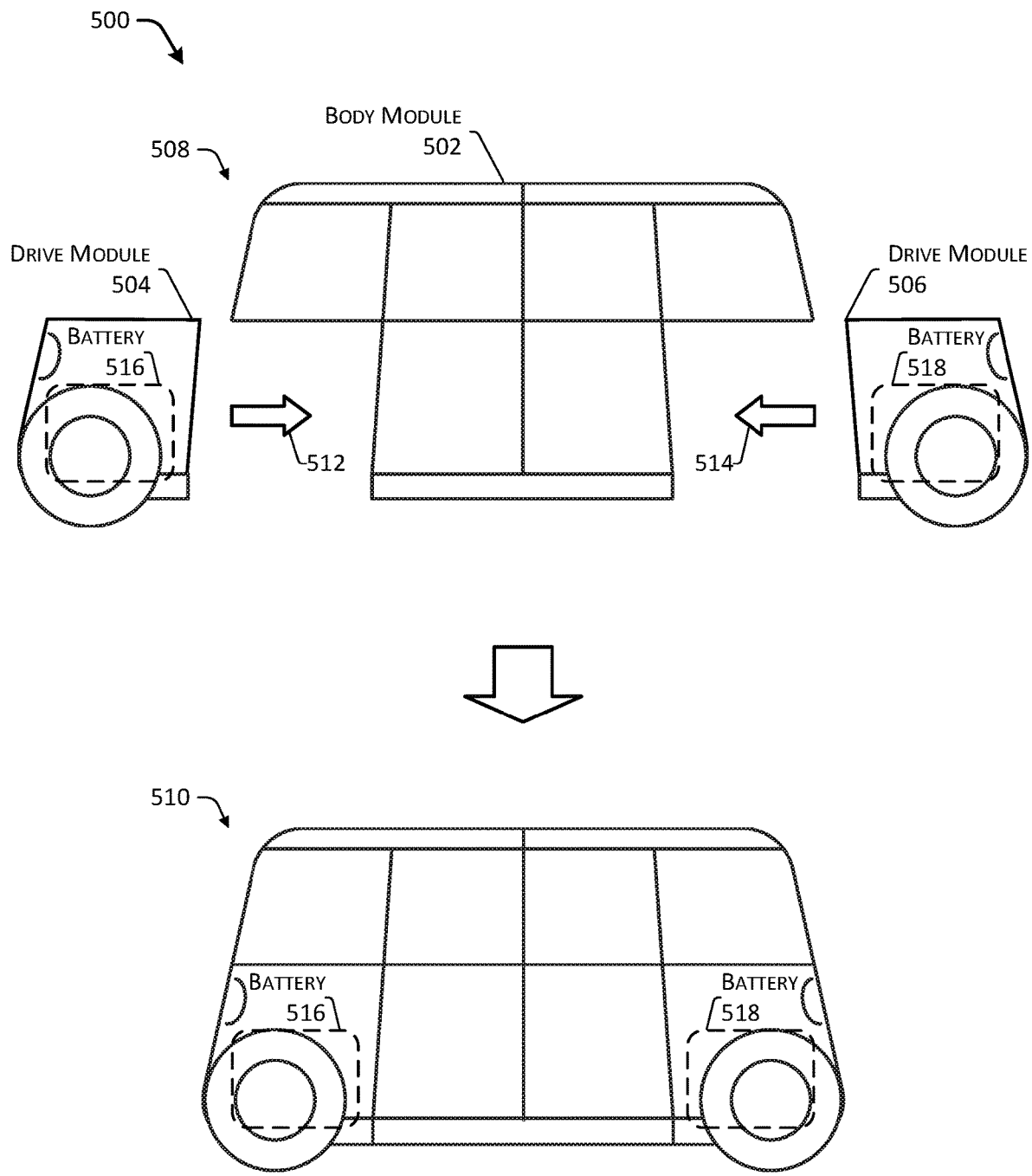
FIG. 5 is a schematic view of an example vehicle comprising a body module and a pair of drive modules disposed at opposite ends of the body module.

FIG. 5 is a schematic view of an example vehicle 500 comprising a body module 502 and a pair of drive modules disposed at opposite ends of the body module 502. In particular, the pair of drive modules can include a first drive module 504 and a second drive module 506, which, in some examples, can be substantially the same as the drive modules 104 and 106, respectively, of FIG. 1. FIG. 5 illustrates the vehicle 500 in an unassembled state 508 (at the top of the page) and an assembled state 510 (at the bottom of the page). In the unassembled state 508 shown at the top of the page, the body module 502 can be supported by supports that are internal or integrated into the vehicle 500, or that are built into a service center, or the like.

During installation, in this example, the drive modules 504 and 506 can be installed by moving them toward the body module 502 in a longitudinal direction of the vehicle 500, as shown by the horizontal arrows 512 and 514 in FIG. 1. Upon installing the drive modules 504 and 506 with the body module 502, a battery 516 included in the drive module 504 and a battery 518 included in the drive module 520 can be electrically coupled via a bus, as discussed herein. In some instances, the drive modules 504 and 506 can be installed by moving them towards the body module 502 in a vertical direction.

In this example, the vehicle 500 is a bidirectional vehicle and the first drive module 504 and the second drive module 506 are substantially identical to one another. As used herein, a bidirectional vehicle is one that is configured to switch between traveling in a first direction of the vehicle and a second, opposite, direction of the vehicle. In other words, there is no fixed "front" or "rear" of the vehicle 500. Rather, whichever longitudinal end of the vehicle 500 is leading at the time becomes the "front" and the trailing longitudinal end becomes the "rear." In other examples, the techniques described herein may be applied to vehicles other than bidirectional vehicles. Also, whether or not the vehicle is bidirectional, the first drive and second drive modules may be different from one another. For example, one drive module may have a subset of the features of the other drive module. In one such example, the first module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In other examples, the drive modules may have one or more distinct or mutually exclusive vehicle systems (e.g., one drive module has an HVAC system and the other drive module has a drive motor). As another non-limiting example of such, one module may have an HVAC system while the other drive module has a newer HVAC system having a higher efficiency.

As shown this example, the body module 502 includes a passenger compartment with an opening for ingress and egress of passengers. The opening is covered by a pair of doors that may be opened manually or automatically by actuators in the body module 502. One or more speakers, lights, and/or interfaces (e.g., physical buttons, switches, controls, microphones, and/or displays including one or more graphical interfaces) may be disposed within the passenger compartment of the body module 502 to receive input from, and provide output to, one or more passengers of the vehicle 500. The body module 502 also includes several windows and a sunroof or moon roof, which are unnumbered in this figure. The windows and/or the sun/moon roof may open manually, automatically, or may not be openable. The body module 502 also includes a vehicle computing device (not shown in this figure) to control operation of the vehicle 500. Details of an example vehicle computing device usable with the vehicle 500 are described below with reference to the example computing architecture of FIG. 8.

The drive modules 504 and 506 include wheels and one or more vehicle systems (e.g., propulsion systems, power systems, steering systems, braking systems, suspension systems, and/or other systems), as discussed herein.

The vehicle 500 may also include one or more sensors to sense objects surrounding the vehicle or conditions of the vehicle and/or one or more emitters to emit light or sound into a surrounding of the vehicle. These sensors and/or emitters may be located on the body module 502, the drive modules 504 and 506, or both. Examples of sensors that may be included in the vehicle 500 include, without limitation, ultrasonic sensors, radar sensors, light detection and ranging (LIDAR) sensors, cameras, microphones, inertial sensors (e.g., inertial measurement units, accelerometers, gyros, magnetometers, etc.), global positioning satellite (GPS) sensors, and the like. Examples of emitters that can be included in the vehicle 500 include, without limitation, lights to illuminate a region generally in front or behind the vehicle (e.g., head/tail lights), lights to signal a direction of travel or other indicator of vehicle action (e.g., indicator lights, signs, light arrays, etc.), one or more audio emitters (e.g., speakers, speaker arrays, horns, etc.) to audibly communicate with pedestrians or other nearby vehicles.

Figure 6:
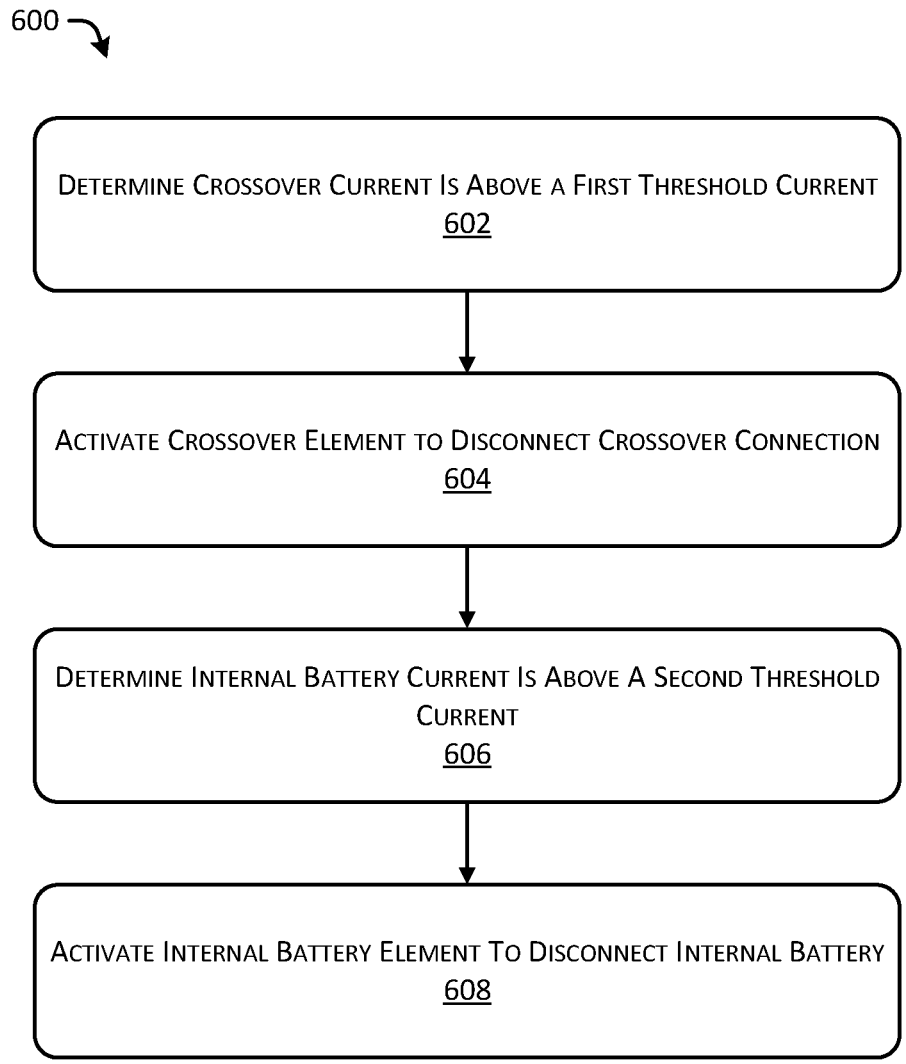
FIG. 6 depicts an example process for implementing the fail operational circuit protection, as discussed herein.
Figure 7:
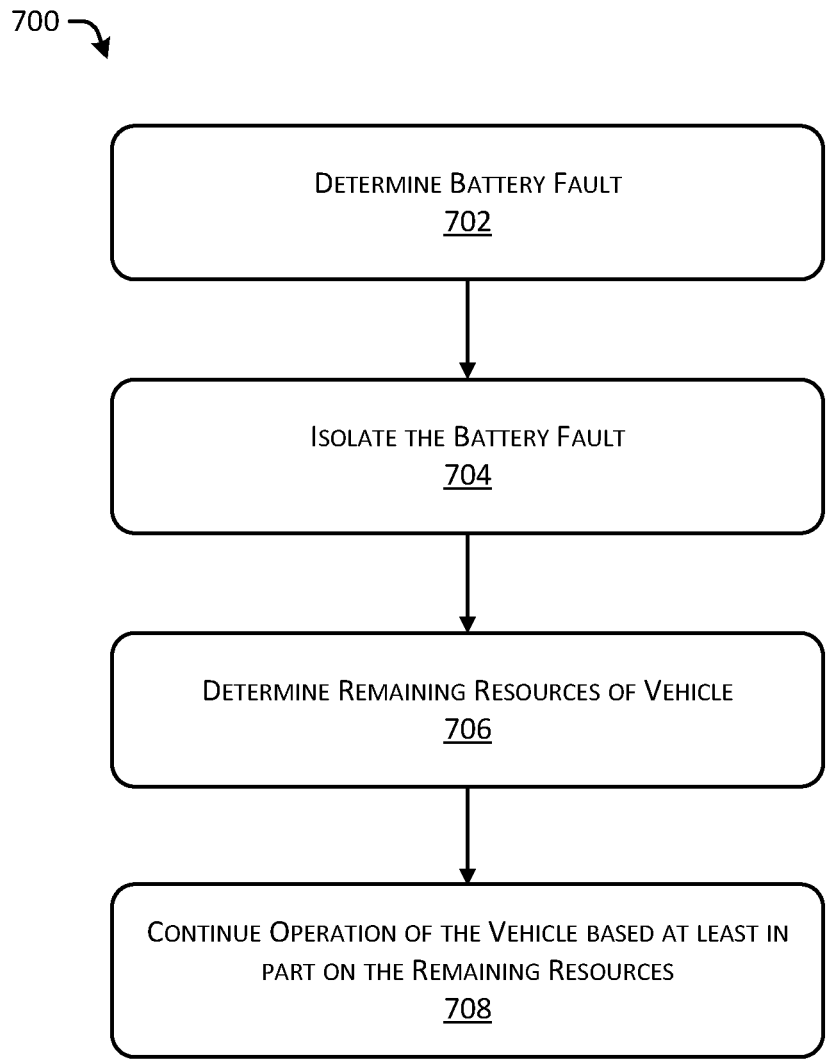
FIG. 7 depicts an example process for isolating a battery fault and continuing operation of the vehicle, as discussed herein.

FIGS. 6 and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 depicts an example process 600 for implementing the fail operational circuit protection, as discussed herein. For example, some or all of the process 600 can be performed by one or more components in the FIG. 1-5 or 8, as described herein.

At operation 602, the process can include determining that a crossover current is above a first threshold current. In some examples, the crossover current can refer to a current on the bus 108, 206, 306, or 406, as discussed herein. In some instances, the operation 602 can include sensing current on the bus via one or more current sensors 208 or 408, and in some instances, the operation 602 can be performed by the fuse circuit elements (e.g., 130, 152, 308, etc.) as discussed herein.

Further, the operation 602 can include determining the first threshold current level. As discussed herein, a thermal fuse can be selected based on an expected current level during normal operations, which can determine the first threshold current level. In some examples, such as in the case of using controllable circuit elements, the operation 602 can include determining a first threshold current based on an operation of the vehicle or device. For example, the operation 602 can include receiving parameters or metrics associated with the operation of the vehicle, including but not limited to: a speed of the vehicle; torque level to be produced by motor(s) of the vehicle; a route of the vehicle; expected power requirements (e.g., based on lane changes, accelerations, decelerations, third-party vehicles, emergency conditions, etc.); historical power requirements based on the vehicle parameters or based on aggregated or fleet-wide vehicle parameters; battery parameters (e.g., age, charging cycles, capacity, temperature, pH, etc.); vehicle load (e.g., number of passengers, cargo, etc.); external attributes (e.g., weather, temperature, wind speed, etc.); road conditions; traffic; and the like. Thus, in some instances, the first threshold current can be set dynamically based at least in part on vehicle attributes or performance.

In some instances, the operation 602 can include determining a location of the fault in the electrical system. For example, when actively sensing the current via the current sensors 208 or 408, a current in a first direction can indicate a first location of the fault, while a current in a second direction can indicate a second location of the fault.

At operation 604, the process can include activating a crossover element to disconnect a crossover connection. For example, in some instances, the operation 604 can include triggering a fuse or controllable circuit element to open the crossover connection provided by the bus, as discussed herein. In some examples, the operation 604 can include the fuses (e.g., 130, 152, 308, etc.) opening, and in some instances, the operation 604 can include the providing a control signal to one or more of the switches 214, 218, or 412 to open the circuit connection. In some instances, the control signals can be provided by the switch controllers 210 or 410 to the various circuit elements. In some instances, the operation 604 can include determining or verifying that the crossover connection has been disconnected based on an absence of crossover current.

At operation 606, the process can include determining that an internal battery current is above a second threshold current. In some instance, the operation 606 can be based at least in part on determining a location of a fault in the electrical system and which battery corresponds to the location of the fault.

At operation 608, the process can include activating one or more internal battery elements to disconnect an internal battery, as discussed herein. For example, in some instances, the operation 608 can be performed by fuses (e.g., 128, 150, 310, or 312), and in some instances, the operation 606 can be performed by switches (e.g., 212, 216, 414, or 416) receiving control signals from the switch controllers 210 and 410, as discussed herein. In some instances, the operation 608 can include opening the circuit to the affected battery after a predetermined time has passed from the opening of the crossover connection.

FIG. 7 depicts an example process 700 for isolating a battery fault and continuing operation of the vehicle, as discussed herein. For example, some or all of the process 700 can be performed by one or more components in the FIG. 1-5 or 8, as described herein.

At operation 702, the process can include determining a battery fault. In some instances, the operation can include determining that a current (e.g., a bus current) is above a threshold, or that a temperature of a battery is above a threshold value. As discussed herein, a battery fault (or a fault associated with a drive module) can be determined in any number of ways.

At operation 704, the process can include isolating the battery fault. In some cases, the operation 702 and 702 can be performed substantially automatically as a result of fuses being sized according to an expected fault current in an electrical system. That is, the fuse can be associated with a particular $I^2t$ rating, above which the fuses can be activated to open a circuit. In some cases, the operation 704 can include generating and/or transmitting control signals to one or more circuit elements (e.g., switches) to cause an open circuit, thereby isolating the battery fault.

At operation 706, the process can include determining remaining resources of a vehicle. For example, the remaining resources can include a remaining amount of electrical power, operational systems, remaining capabilities of the vehicle (e.g., all wheel drive or two wheel drive, steering capabilities (e.g., all wheel or two wheel), etc.), and the like. In some instances, the operation 706 can include determining an amount of resources associated with completing an operation or task associated with the vehicle (e.g., delivering a passenger, navigating to a location, etc.). In some instances, the operation 706 can include determining a plurality of routes or operations of the vehicle to conserve resources.

At operation 708, the process can include continuing operation of the vehicle based at least in part on the remaining resources. For example, although an electrical system can encounter a fault causing a battery to be isolated or removed from operation, the vehicle discussed herein can operation in a "fail operational" manner, meaning the vehicle can continue to navigate an environment and complete tasks such as picking up a passenger, dropping off a passenger, safely coming to a stop, or navigating to a service center for diagnostics or repair. In some instances, the operation 708 can include providing an indication of the battery fault to a central server or repair location. In some instances, the operation 708 can include reducing power requirements of the vehicle by altering a route (e.g., to travel on roads having a lower speed), reducing accelerations, restricting or limiting auxiliary devices (e.g., reducing air conditioning in the summer or a heater in the winter), and the like.

Figure 8:
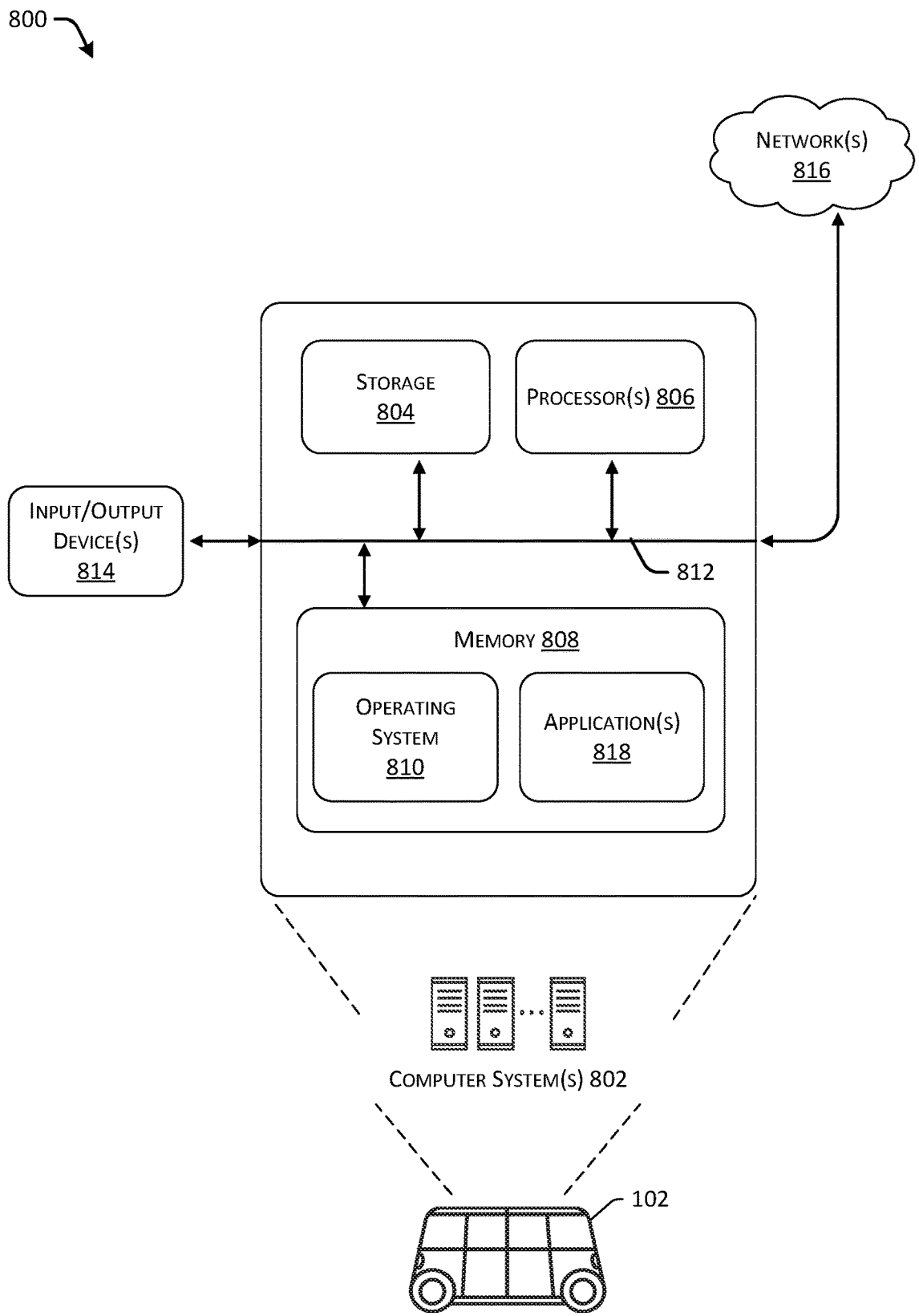
FIG. 8 depicts a block diagram of an example computer system for implementing the techniques described herein.

FIG. 8 illustrates an environment 800 in which the disclosures may be implemented in whole or in part. The environment 800 depicts one or more computer systems 802 that comprise a storage 804, one or more processor(s) 806, a memory 808, and an operating system 810. The storage 804, the processor(s) 806, the memory 808, and the operating system 810 may be communicatively coupled over a communication infrastructure 812. Optionally, the computer system 802 may interact with a user, or environment, via input/output (I/O) device(s) 814, as well as one or more other computing devices over a network 816, via the communication infrastructure 812. The operating system 810 may interact with other components to control one or more applications 818.

As can be understood in the context of this disclosure, the computer system 802 can be implemented in an autonomous vehicle, a semi-autonomous vehicle, or any vehicle (e.g., the vehicle 102, in general) utilizing at least two battery systems coupled in parallel.

In some instances, the computer system(s) 802 may implement (at least in part) the functions of the current sensors 208 and 408, or the switch controllers 210 and 410, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 8. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computing device.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as modem cell phones with processing capability, wireless email devices including BlackBerry™ devices), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing,"

"computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. An electrical system configured to supply electric power to a first electric load and a second electric load, the electrical system comprising: a first battery electrically coupled to the first electric load and a bus; a second battery electrically coupled to the second electric load and the bus, wherein the first battery and the second battery are electrically coupled in parallel via a connection provided by the bus; a first circuit element configured to electrically disconnect the connection between the first battery and the second battery provided by the bus at a first time in which a first electrical current associated with the bus is above a first threshold current; a second circuit element configured to electrically disconnect the first battery from the first electric load at a second time in which a second electrical current output by the first battery is above a second threshold current; and a third circuit element configured to electrically disconnect the second battery from the second electric load at a third time in which a third electrical current output by the second battery is above a third threshold current; wherein the first threshold current is lower than the second threshold current and the third threshold current; and wherein the second threshold current and the third threshold current are substantially identical.

B. An electrical system as paragraph A recites, wherein the first circuit element is a first switch, the second circuit element is a second switch, the third circuit element is a third switch, the electrical system further comprising: at least one sensor configured to monitor the first electrical current associated with the bus; and at least one controller configured to: receive an indication from the at least one sensor indicative of the first electrical current; determine that the first electrical current is above the first threshold current; and control operation of at least the first switch to electrically disconnect the connection between the first battery and the second battery provided by the bus at the first time in which the first electrical current is above the first threshold current.

C. An electrical system as paragraph B recites, wherein the controller is further configured to: determine that the first electrical current is provided by the first battery; and control operation of the second switch to electrically disconnect the first battery from the first electric load based at least in part on determining that the first electrical current is provided by the first battery.

D. An electrical system as paragraph B or C recites, wherein the first switch includes at least one of: a pyrotechnic fuse; or a relay.

E. An electrical system as any one of paragraphs B-D recite, wherein the at least one controller is further configured to determine the first threshold current based at least in part on one or more operational parameters of a vehicle including the electrical system.

F. An electrical system as paragraph A recites, wherein: the first circuit element is a first thermal fuse; the second circuit element is a second thermal fuse; and the third circuit element is a third thermal fuse.

G. An electrical system as any one of paragraphs A-F recite, wherein the first electric load includes one or more of: one or more drive motors; one or more steering motors; one or more voltage converters; one or more computing systems; one or more air conditioning systems; one or more heating systems; one or more braking systems; one or more lights; one or more blowers; one or more audio systems; one or more charging systems; or one or more sensors.

H. An electrical system as any one of paragraphs A-G recite, wherein upon the second circuit element electrically disconnecting the first battery from the first electric load at the second time, the third circuit element is configured to maintain an electrical connection between the second battery and the second electric load.

I. A vehicle comprising: a body module configured to carry at least one of a passenger or cargo; a first drive module removably coupled to the body module and configured to provide at least first torque for propulsion of the vehicle, the first drive module including: a first battery; a first circuit element configured to selectively electrically decouple the first battery from an electrical bus based at least in part on a first electrical current associated with the electrical bus meeting a first threshold current; and a second circuit element configured to selectively electrically decouple the first battery from a first electrical load based at least in part on a second electrical current provided by the first battery meeting a second threshold current, the first electrical load including at least a first drive motor configured to provide at least a portion of the first torque; and a second drive module removably coupled to the body module and configured to provide at least second torque for propulsion of the vehicle, the second drive module including: a second battery; a third circuit element configured to electrically decouple the second battery from the electrical bus based at least in part on a third electrical current associated with the electrical bus meeting a third threshold current; and a fourth circuit element configured to electrically decouple the second battery from a second electrical load based at least in part on a fourth electrical current provided by the second battery meeting a fourth threshold current, the second electrical load including at least a second drive motor configured to provide at least a portion of the second torque.

J. A vehicle as paragraph I recites, wherein: the first circuit element is a first thermal fuse or a first switch; the second circuit element is a second thermal fuse or a second switch; the third circuit element is a third thermal fuse or a third switch; and the fourth circuit element is a fourth thermal fuse or a fourth switch.

K. A vehicle as paragraph J or K recites, wherein the first drive module further includes a backup power supply configured to provide power to a computing system associated with the first drive module at a time in which the second circuit element electrically decouples the first battery from the first electric load.

L. A vehicle as paragraph I recites, wherein the first circuit element is a first switch, the second circuit element is a second switch, the third circuit element is a third switch, and the fourth circuit element is a fourth switch, the vehicle further comprising: at least one sensor configured to monitor the first electrical current or the second electrical current; and at least one controller configured to: receive a signal from the at least one sensor indicative of the first electrical current or the second electrical current; determine that the first electrical current meets the first threshold current; control operation of at least the first switch to electrically decouple the first battery from the electrical bus at a first time; and control operation of at least the second switch to electrically decouple the first battery from the from the first electrical load at a second time, the second time after the first time.

M. A vehicle as paragraph L recites, wherein the at least one controller is further configured to maintain an electrical connection between the second battery and the second electrical load including the second drive motor to provide at least the portion of the second torque at a third time in which the first battery is electrically decoupled from the first electrical load including the first drive motor.

N. A vehicle as paragraph L or M recites, wherein the at least one controller is further configured to determine the first threshold current based at least in part on an expected current to be provided by the first battery.

O. A vehicle as any one of paragraphs L-N recite, wherein the first switch is a pyrotechnic fuse configured to receive a control signal from the at least one controller.

P. A vehicle as any one of paragraphs I-O recite, wherein the first threshold current is lower than the second threshold current and wherein the third threshold current is lower than the fourth threshold current.

Q. A method of operating an electrical system configured to supply electric power to a first electric load and a second electric load, the method comprising: electrically decoupling a connection provided by an electrical bus at a first time in which a first electrical current associated output by a first battery or a second battery meets a first threshold current, wherein the first battery and the second battery are electrically coupled in parallel via an electrical bus; electrically decoupling the first battery from the first electric load at a second time in which a second electrical current output by the first battery is above a second threshold current; and electrically decoupling the second battery from the second electric load at a third time in which a third electrical current output by the second battery is above a third threshold current.

R. A method as paragraph Q recites, further comprising: monitoring at least the first electrical current; and providing an indication of the first electrical current to a controller.

S. A method as paragraph R recites, further comprising instructing an electrically controllable circuit element to decouple the connection provided by the electrical bus at the first time via an instruction from the controller.

T. A method as any one of paragraphs Q-S recite, wherein the first battery is configured to provide power to the first electric load at the third time at which the second battery is electrically decoupled from the second electric load.

While the example clauses described above are described with respect to one particular implementation, it should be understood that, in the context of this document, the content of the example clauses can also be implemented via a method, device, system, and/or computer storage media.

What is claimed is:
1. A vehicle comprising:
a body module;
a first drive module coupled to the body module, the first drive module configured to provide a first torque for propulsion of the vehicle, the first drive module comprising:
  a first battery;
  a first circuit element configured to electrically decouple the first battery from an electrical bus based at least in part on a first electrical current associated with the electrical bus meeting or exceeding a first threshold current; and
  a second circuit element configured to electrically decouple the first battery from a first electrical load based at least in part on a second electrical current provided by the first battery meeting or exceeding a second threshold current; and
a second drive module coupled to the body module, the second drive module configured to provide a second torque for propulsion of the vehicle, the second drive module comprising:
  a second battery;
  a third circuit element configured to electrically decouple the second battery from the electrical bus based at least in part on a third electrical current associated with the electrical bus meeting or exceeding a third threshold current; and a fourth circuit element configured to electrically decouple the second battery from a second electrical load based at least in part on a fourth electrical current provided by the second battery meeting or exceeding a fourth threshold current, wherein;

the first circuit element, the second circuit element, the third circuit element, and the fourth circuit element comprise switches, the first drive module is further configured to provide the first torque for the propulsion of the vehicle in response to receiving an electrical power directly from at least one of the first battery and the second battery independently or simultaneously, and the vehicle further comprises one or more processors configured to acuate the first circuit element, the second circuit element, the third circuit element, or the fourth circuit element to transmit the electrical power directly from the at least one of the first battery and the second battery independently or simultaneously to the first drive module, or to decouple the at least one of the first battery and the second battery from providing the electrical power to the first drive module.

2. The vehicle of claim 1, wherein:
the first circuit element is a first thermal fuse or a first switch;
the second circuit element is a second thermal fuse or a second switch;
the third circuit element is a third thermal fuse or a third switch; and
the fourth circuit element is a fourth thermal fuse or a fourth switch.

3. The vehicle of claim 1, wherein the first drive module further includes a backup power supply configured to provide power to a computing system associated with the first drive module at a time in which the second circuit element electrically decouples the first battery from the first electric load.

4. The vehicle of claim 1, wherein the first circuit element is a first switch, the second circuit element is a second switch, the third circuit element is a third switch, and the fourth circuit element is a fourth switch, the vehicle further comprising:
at least one sensor configured to monitor the first electrical current or the second electrical current; and
a controller configured to:
receive a signal from the at least one sensor indicative of the first electrical current or the second electrical current;
determine that the first electrical current meets the first threshold current;
control operation of at least the first switch to electrically decouple the first battery from the electrical bus at a first time; and
control operation of at least the second switch to electrically decouple the first battery from the first electrical load at a second time, the second time after the first time.

5. The vehicle of claim 4, wherein the controller is further configured to maintain an electrical connection between the second battery and the second electrical load to provide at least a portion of the second torque at a third time in which the first battery is electrically decoupled from the first electrical load.

6. The vehicle of claim 4, wherein the controller is further configured to determine the first threshold current based at least in part on an expected current to be provided by the first battery.

7. The vehicle of claim 1, wherein the first electrical load comprises one or more of:
a drive motor;
a steering motor;
a voltage converter;
a computing system;
an air conditioning system;
a heating system;
a braking system;
a light;
a blower;
an audio system;
a charging system; or
a sensor.

8. The vehicle of claim 1, wherein the first threshold current is lower than the second threshold current and wherein the third threshold current is lower than the fourth threshold current.

9. A system comprising:
a body module;
a drive module coupled to the body module, the drive module configured to provide torque for propulsion of a vehicle;
a first battery and a second battery;
a first circuit element configured to electrically decouple the first battery from an electrical bus based at least in part on a first electrical current associated with the electrical bus meeting or exceeding a first threshold current;
a second circuit element configured to electrically decouple the first battery from an electrical load based at least in part on a second electrical current provided by the first battery meeting or exceeding a second threshold current; and
a third circuit element configured to electrically decouple the second battery from the electrical bus based at least in part on a third electrical current associated with the electrical bus meeting or exceeding a third threshold current, wherein:
the first circuit element, the second circuit element, and the third circuit element comprising switches,
the drive module is further configured to provide the torque for the propulsion of the vehicle in response to receiving an electrical power directly from at least one of the first battery and the second battery independently or simultaneously, and
the vehicle further comprises one or more processors configured to acuate the first circuit element, the second circuit element, or the third circuit element to transmit the electrical power directly from the at least one of the first battery and the second battery independently or simultaneously to the drive module, or to decouple the at least one of the first battery and the second battery from providing the electrical power to the drive module.

10. The system of claim 9, wherein the first threshold current is lower than the second threshold current.

11. The system of claim 9, wherein the first circuit element comprises a switch, the system further comprising:
one or more sensors configured to monitor the first electrical current associated with the electrical bus.

12. The system of claim 11, further comprising a controller configured to:

receive an indication from the one or more sensors indicative of the first electrical current;
determine that the first electrical current is above the first threshold current; and
control operation of the switch to electrically disconnect the first battery and the electrical bus at a time in which the first electrical current is above the first threshold current.

13. The system of claim 9, further comprising:
a second drive module configured to provide a second torque for the propulsion of the vehicle in response to receiving the electrical power from the at least one of the first battery or the second battery.

14. The system of claim 13, wherein:
the drive module comprises the first battery, the first circuit element, and the second circuit element; and
the second drive module comprises the second battery and the third circuit element.

15. The system of claim 9, wherein the first battery and the second battery are electrically coupled in parallel via the electrical bus.

16. The system of claim 9, wherein the electrical load comprises one or more of:
a drive motor;
a steering motor;
a voltage converter;
a computing system;
an air conditioning system;
a heating system;
a braking system;
a light;
a blower;
an audio system;
a charging system; or
a sensor.

17. A vehicle comprising:
a drive module configured to provide torque for propulsion of the vehicle;
a first battery electrically coupled to a first electric load and a bus;
a second battery electrically coupled to a second electric load and the bus;
a first circuit element configured to electrically decouple the first battery from the bus based at least in part on a first electrical current associated with the bus meeting or exceeding a first threshold current;
a second circuit element configured to electrically decouple the first battery from the first electrical load based at least in part on a second electrical current provided by the first battery meeting or exceeding a second threshold current; and
a third circuit element configured to electrically decouple the second battery from the bus based at least in part on a third electrical current associated with the bus meeting or exceeding a third threshold current, wherein;
the first circuit element, the second circuit element, and the third circuit element comprising switches,
the drive module is further configured to provide the torque for the propulsion of the vehicle in response to receiving an electrical power directly from at least one of the first battery and the second battery independently or simultaneously, and
the vehicle further comprises one or more processors configured to acuate the first circuit element, the second circuit element, or the third circuit element to transmit the electrical power directly from the at least one of the first battery and the second battery independently or simultaneously to the drive module, or to decouple the at least one of the first battery and the second battery from providing the electrical power to the drive module.

18. The vehicle of claim 17, further comprising:
a fourth circuit element configured to electrically decouple the second battery from the second electrical load based at least in part on a fourth electrical current provided by the second battery meeting or exceeding a fourth threshold current.

19. The vehicle of claim 17, further comprising:
a second drive module configured to provide a second torque for the propulsion of the vehicle in response to receiving the electrical power from the at least one of the first battery or the second battery.

20. The vehicle of claim 17, further comprising: a switch controller communicatively coupled to the first circuit element, the second circuit element, and the third circuit element, and configured to selectively enable the first circuit element, the second circuit element, and the third circuit element to control a distribution of the electrical power from the at least one of the first battery and the second battery.

* * * * *